(12) United States Patent
Smith et al.

(10) Patent No.: US 6,785,840 B1
(45) Date of Patent: Aug. 31, 2004

(54) CALL PROCESSOR SYSTEM AND METHODS

(75) Inventors: Leslie Smith, Plesanton, CA (US); Robert La Riviere, Shawnee Mission, KS (US); Ken Guo, San Jose, CA (US); Ian Hopper, Sunnyvale, CA (US); Jimmy Jin, San Jose, CA (US)

(73) Assignee: Nortel Networks Limited, St. Laurent (CA)

(*) Notice: Subject to any disclaimer, the term of this patent is extended or adjusted under 35 U.S.C. 154(b) by 455 days.

(21) Appl. No.: 09/652,519

(22) Filed: Aug. 31, 2000

Related U.S. Application Data

(60) Provisional application No. 60/152,140, filed on Aug. 31, 1999.

(51) Int. Cl.[7] ................................................ G06F 11/00
(52) U.S. Cl. ........................ 714/11; 714/4; 710/305
(58) Field of Search ........................ 714/11, 4, 13, 714/12, 43; 710/105, 305

(56) References Cited

U.S. PATENT DOCUMENTS 5,848,128 A * 12/1998 Frey ................................ 379/9
6,005,841 A * 12/1999 Kicklighter .................. 370/217
6,205,557 B1 * 3/2001 Chong et al. ................... 714/4
6,370,654 B1 * 4/2002 Law et al. ...................... 714/4
6,460,146 B1 * 10/2002 Moberg et al. ............... 714/10
6,487,591 B1 * 11/2002 Budhraja et al. ........... 709/223
6,557,121 B1 * 4/2003 McLaughlin et al. ......... 714/44

* cited by examiner

Primary Examiner—Scott Baderman
(74) Attorney, Agent, or Firm—Kevin L. Smith

(57) ABSTRACT

A system for implementing a high-availability architecture comprising a first compact Peripheral Component Interconnect shelf, a second compact Peripheral Component Interconnect shelf, and a network. The first and second compact peripheral component interconnect shelf are redundant systems. The first compact peripheral component interconnect shelf comprises a first system utility card connected to a first compact core to network interface connected to a first compute platform connected to a first high speed pipe interface. The second compact peripheral component interconnect shelf comprises a second system utility card connected to a second compact core to network interface connected to a second compute platform connected to a second high speed pipe interface. The first and second compact peripheral component interconnect shelf are connected via Ethernet. The first and second compact core to network interface is connected to the network.

5 Claims, 8 Drawing Sheets

CALL PROCESSOR SYSTEM AND METHODS

CROSS-REFERENCE TO RELATED APPLICATION

The present application claims the benefit under 35 U.S.C. §119(e) of U.S. Provisional Application No. 60/152,140 filed Aug. 31, 1999.

TECHNICAL FIELD

The present invention relates generally to call processor architectures, and in particular to methods and apparatus for high-availability call processor systems and methods.

BACKGROUND ART

Conventional call processor systems use special purpose, dedicated systems for implementing redundancy. For example, some conventional systems utilize two computer systems, one of which is active and the other standby, and special purpose hardware and software that interacts with each computer system to implement high-availability. The special purpose hardware and software communicates with the active computer system to capture status information so that in the event the active system goes down the standby system can start in place of the active system using the information collected by the special purpose hardware and software.

Thus, conventional high-availability architectures require special purpose hardware and software, which raises system costs. The additional costs make systems very expensive. There is, therefore, a need for a high-availability architecture that solves the problems associated with special purpose hardware and software high-availability systems.

SUMMARY OF THE INVENTION

The call processor system consistent with the invention takes advantage of commercial off the shelf (COTS) products while maintaining high availability. The call processor system is comprised of four main components: X86 Single Board Compute Platform (CP PII), System Area Network (SAN) interface, high-speed pipes (HSP's), System Utility Card (SU), and a Core to Network Interface Card (cCNI).

The compact peripheral component interconnect (cPCI) standard specifies both the packaging, format and the electrical interface for the back plane and the on card bus structure of the system. The cPCI standard also include the hotswap specification. The hot swap specification has standardized a way to insert and remove circuit packs in a live system without affecting other circuit packs that share the same bus. The specification also specifies how an operating system (OS) can be notified so as to allow dynamic loading of drivers.

By using COTS components, future upgrades to newer technologies are easy and quick, thus leveraging the time to market opportunities that can be gained by using, third party off the shelf components. The system implements a high-availability architecture based around a system area networks (SAN) technology that allows the call processor to perform better than conventional systems, and also build a system that could easily evolve. The system features include a 1+1 sparing strategy, graceful switchover that preserves all call states, ungraceful switchover in case of node failure that would preserve all existing, established calls, hard disk drive redundancy, and IP take over (the system presents a logical Ethernet connection to the OA&M connection). The system addresses all of these issues and in addition provides for querying the health of the inactive side at any time. Due to the high bandwidth of new high-speed network interface cards, the complete system memory image can be transferred to the inactive system on command within one second; this type of performance allows the active processor to run asynchronously to the standby system, allowing significant performance gains to be achieved on the active side. When a graceful switchover is required, the complete system state of the active processor can be transferred to the standby processor allowing the standby processor to continue as if it had been in control all the time. This strategy works well for hardware failure.

DETAILED DESCRIPTION

Figure 1:
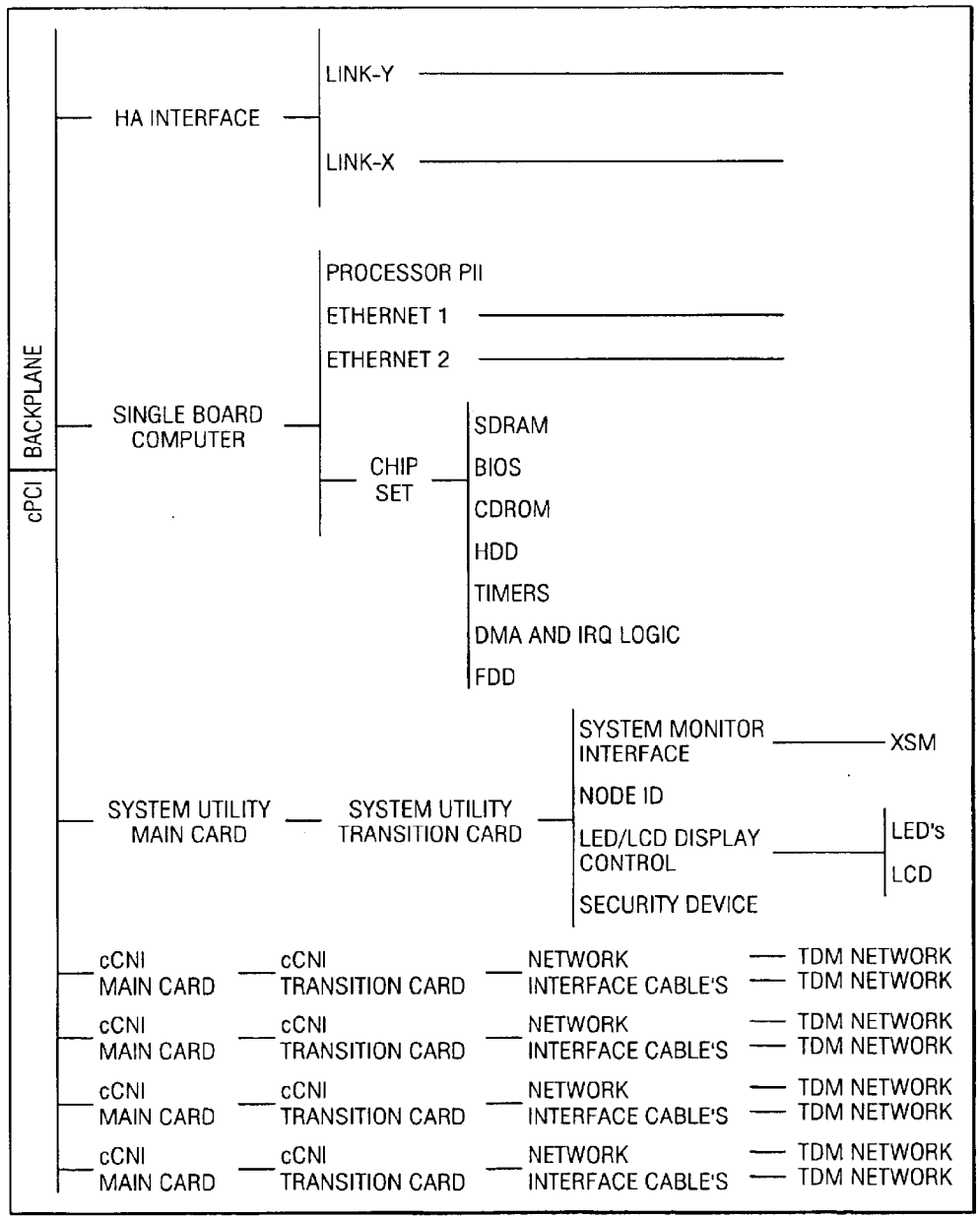
FIG. 1 is a logical hardware structure.

FIG. 1 illustrates the logical hardware structure of various components that make up the system consistent with the present invention. At the top level compact Peripheral Component Interconnect (cPCI) back plane is the master to all the individual components.

Figure 2:
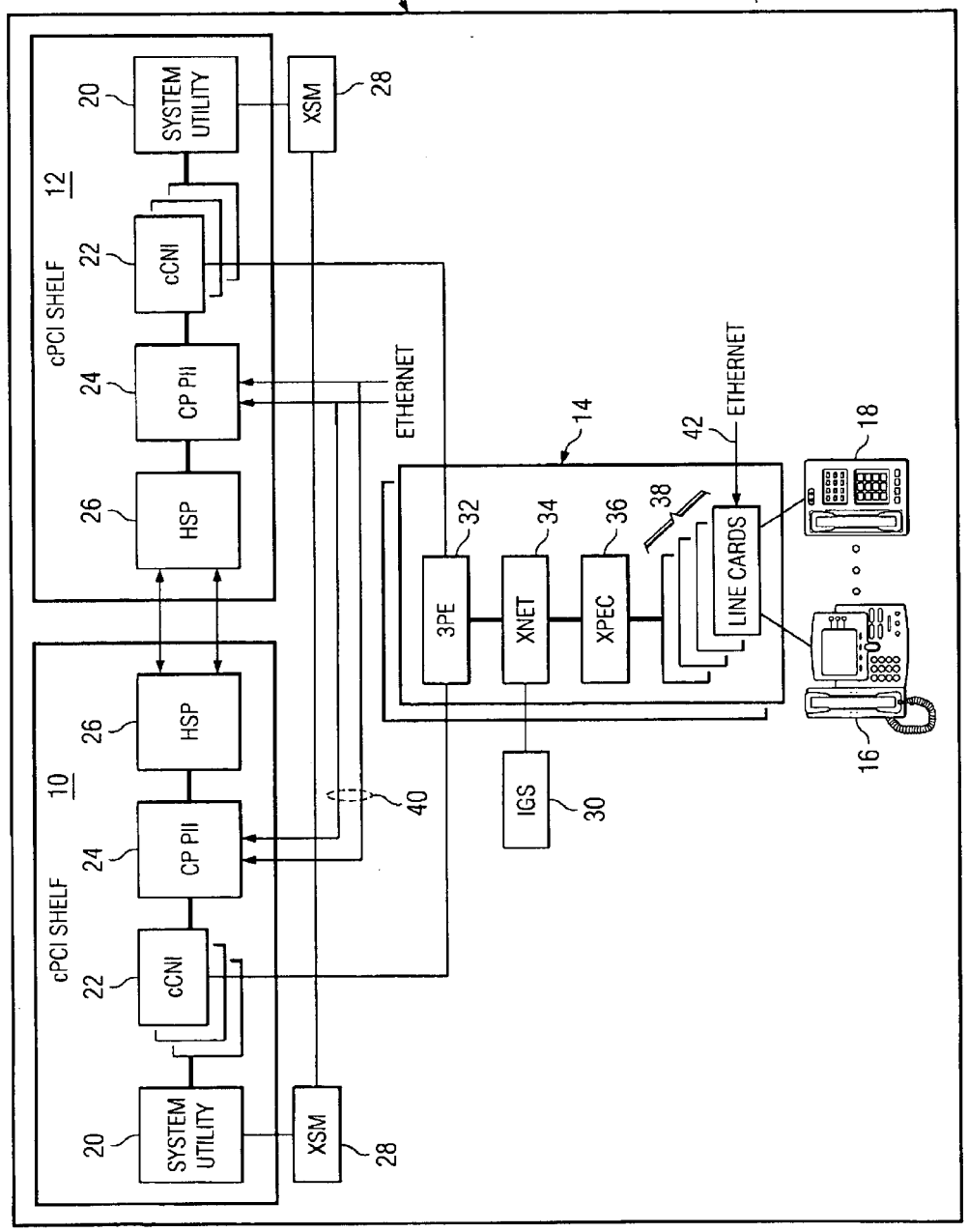
FIG. 2 is a block diagram of a call processor system.

FIG. 2 is a block diagram showing a call processor system 44 consistent with the present invention. Call processor system 44 is comprised of three primary elements: a first compact Peripheral Component Interconnect shelf (cPCI) 10, a second cPCI shelf 12, and network 14. First cPCI shelf 10 and second cPCI shelf 12 in one embodiment are redundant systems. Network 14 processes calls from plural phones 16–18.

In a redundant system, one side is in active mode running call processing, and the other side is in standby mode ready to take over. This is called a redundancy approach. Both the active side and the standby side are running, in parallel, however, the active side is running call processing applications while the inactive side is running only diagnostics and management tasks. Since the status of the inactive side is always known, the system can make better decisions on whether or not to switchover. Redundancy control in a call processor consistent with the present invention is software-based. As a result, all the redundancy related functions are implemented by software. This has several advantages, such as loosening the coupling between the two sides, thus reducing adverse interference between them. Certain features of the redundancy control may still be implemented in hardware.

First cPCI shelf 10 includes a system utility 20, a compact Core to Network Interface (cCNI) 22, a compute platform (CP PII) 24 and a high-speed pipe interface (HSP) 26. cCNI 22 provides a TDM interface into network 14. System utility card 20 interfaces to various system elements, such as the system power monitor (XSM) security device 28. First cPCI shelf 10 is connected to second cPCI shelf 12 via Ethernet 40. XSM 28 is connected to the corresponding XSM of the redundant system. Intergroup switch (IGS) 30 is connected to network 14.

Network 14 is comprised of several groups of elements, each group comprising three-port extender (3PE) 32, XNET 34, XPEC 36, and line card (LC's) 38.

Figure 3:
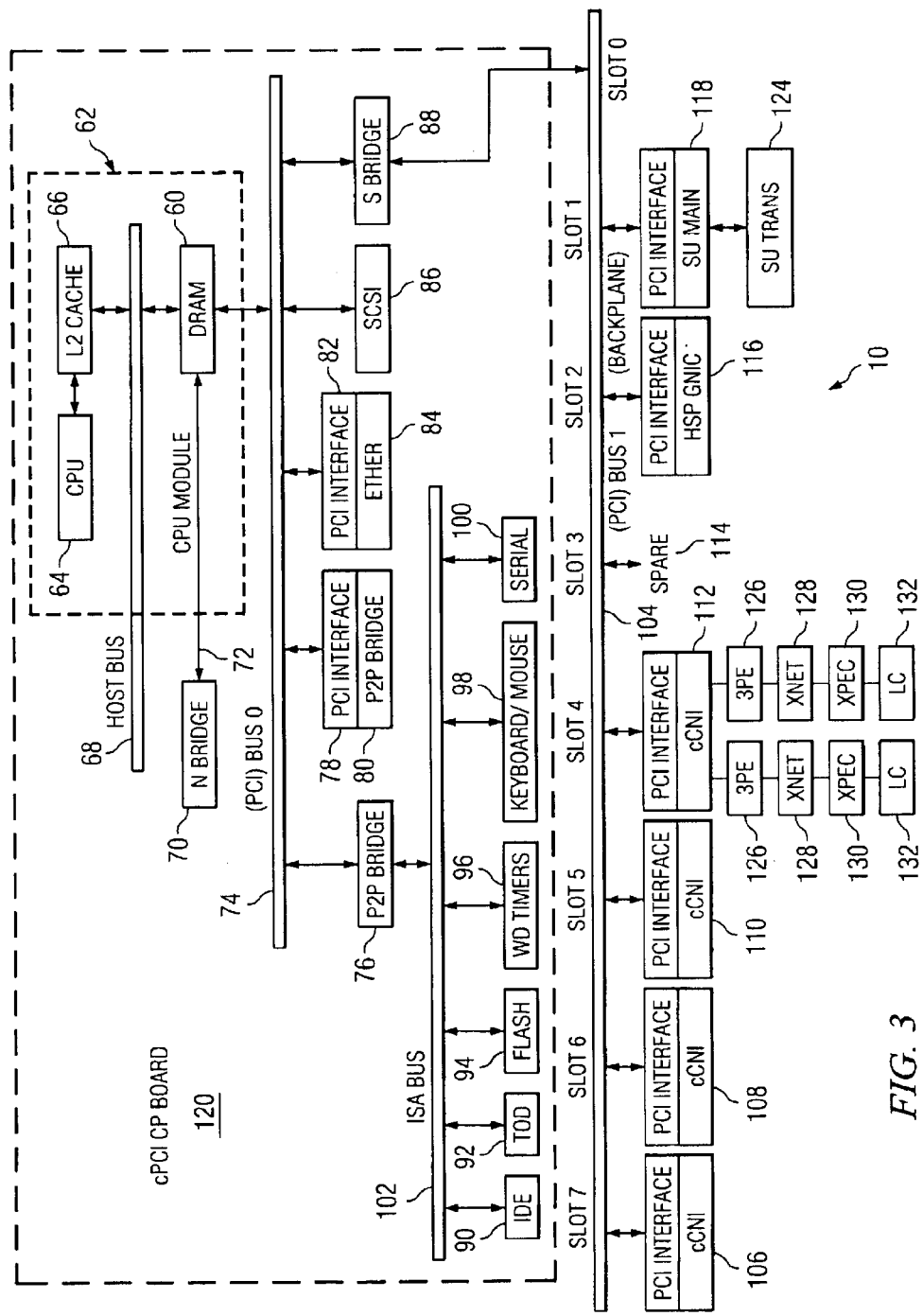
FIG. 3 is a block diagram of a call processor system.

FIG. 3 is a block diagram illustrating call processor system 44 of FIG. 2 in greater detail. Many of the elements of FIG. 3 are similar to those shown in FIG. 2, and have therefore already been discussed. Call processor system 44 includes cPCI CP board 120, which is connected to backplane PCI bus 1 104 via S. bridge 88. cPCI CP board 120 is comprised of CPU module 62 connected to PCI bus 0 74. PCI bus 0 74 is connected to ISA bus 102 via P2P bridge 76. CPU module 62 includes CPU 64, L2 cache 66, and DRAM 60. DRAM 60 is connected directly to PCI bus 0 74, and to N. bridge 70 via bus 72.

PCI bus 0 74 is connected to other buses in the system, and certain devices via PCI interface cards. PCI bus 0 74 is connected to ISA bus 102 via P2P bridge 76, and to slot 0 on PCI bus 1 104 via S. bridge 88. PCI bus 0 74 is also connected to P2P bridge 80 via PCI interface 78, to Ethernet interface 84 via PCI card 82, and directly to SCSI interface 86.

ISA bus 102 is connected to several devices, including IDE 90, TOD 92, flash 94, WD timers 96, keyboard/mouse 98, serial interface 100. PCI bus 1 104 has several slots and serves as a backplane. In this embodiment, each slot is occupied by a device connected to a PCI interface card. The devices include cCNI 106, cCNI 108, cCNI 110, cCNI 112, HSP GNIC 116, and system utility (SU) main 118. cCNI 1112 is further connected to three-port extender (3PE) 126, XNET 128, XPEC 130, and LC 132 (corresponding to 3PE 32, XNET 34, XPEC 36, and LC's 38 of FIG. 2). Each of cCNI's 106, 108, and 110 can be further connected to a configuration of devices similar to 3PE 126, XNET 128, XPEC 130, and line card (LC) 132. SU main 118 is connected to SU transition card 124. Slot 3 is a spare slot 114. XNET 128 is the TDM to messaging interface. XPEC 130 converts the messages down to LC 312. HSP GNIC 116 connects to the other system, as shown in FIG. 2.

Figure 4:
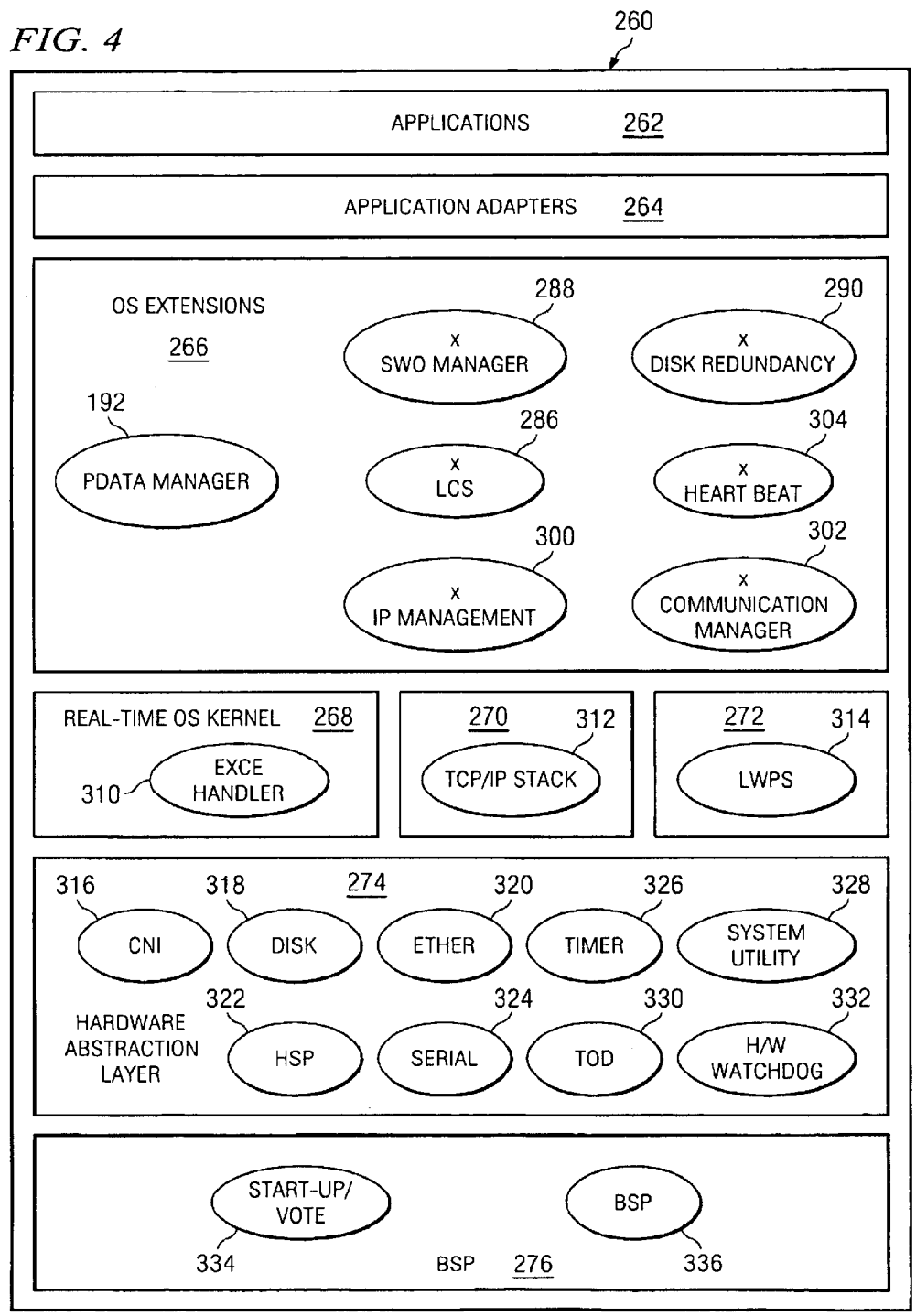
FIG. 4 is a top level view of the software used in a call processor system.

FIG. 4 illustrates a top level view of the software used in a call processor system consistent with the present invention. In one embodiment, each layer only uses the interface provided by the layer below or above it. Software module structure 260 includes applications 262, application adapters 264, operating system (OS) extensions 266, real-time OS kernel 268, TCP/IP stack 312, lightweight protocol stack (LWPS) 314, hardware abstraction layer 274, and board support package (BSP) 276. Real-time OS kernel 268 may, for example, be VxWorks 5.3 from Wind River Systems.

Application adaptors layer 264 provides necessary interface to applications. Applications layer 262 contains new and legacy applications.

Hardware abstraction layer 274 implements hardware-specific drivers. To achieve better fault handling and recovery capability, all the hardware devices are managed by HI. This requires that all the drivers comply with HI driver template. Hardware abstraction layer 274 includes CNI 316, disk 318, Ether 320, HSP 320, serial 324, timer 326, system utility 328, time of day (TOD) 330, and hardware (H/W) watchdog 332.

Figure 6:
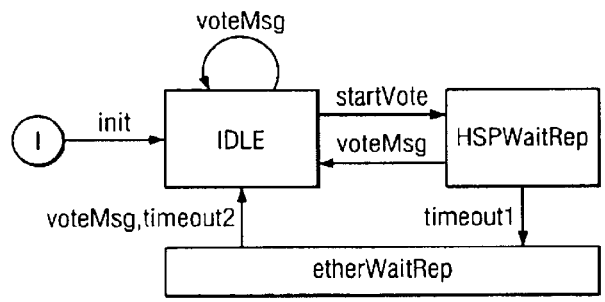
FIG. 6 is a state diagram illustrating the state transition of a voter.

BSP 276 is responsible for controlling start-up sequence, which includes hardware initialization, board configuration and vote. BSP 276 includes start up/vote 334 and BSP module 336. Start up/vote 334 ensures that at startup one of the sides becomes active and takes ownership of the system. Logical call server (LCS) 286 checks the health of the system, and reports this information to start up/vote 334. A voter is used for deciding which CPU becomes active when two sides boot up at same time. Each side checks its own health and sends a health message to the other side. The voting result is based on the health measure of its side. The side with better health will become the active side. In the case of two sides having the same health, two random numbers that are generated one on each side will be compared. The side that has the greater random number will become the active side. Side 0 may be chosen as the default active side in the case of same health. The voting message contains health, redundant state and random number (if needed). If HSP is down, voter 334 does voting through ethernet channel. Since in the pre-vote state, which side is active has not been decided yet, voting is a symmetric process between two sides. So they have the same state diagram. FIG. 6 is a state diagram illustrating the state transition of voter 334. Voter 334 moves between idle, HSPWaitRep and ether WaitRep states when transferring voting information in the system.

Exception and interrupt handling mechanism of the Real-time OS Kernel 268 provides better fault tolerance. Exception handler 310 looks for any condition that will cause an exception, and initiates corrective measures.

Communication stacks 270, 272, which include TCP/IP stack 312 and LWPS 314 respectively, are used for communicating with LAN and as the backup pipe between CPUs. HSP is used for redundancy control. Traditional IP stacks are implemented as a device driver and use kernel resources for its operation. A kernel-independent lightweight stack is useful for implementing the stop and copy operation. In addition, a light-weight stack significantly reduces performance overhead.

OS extensions 266 include logical call server ((LCS) 286, switchover manager (SWOMgr) 288, disk redundancy 290, protected data manager (PdataMgr) 292, IP management 300, communication manager (CommMgr) 302, and heart beat 304.

Communication Manager 302 provides messaging service for local task communication and inter-CPU communications. When any task wants to talk with another entity, such as another task or an entity outside the system, communication manager 302 coordinates the communication between the task and the entity.

LCS 286 manages the call server's redundant state and coordinates redundancy-related operations, such as, switchover, split, join, and IP address management. Redundant CPU's provides fault-tolerant capability. Therefore, a redundant call server with two physical CPU's is basically a logical unit for providing computing service for applications. This requires that there be some software components that manage two CPU's as whole. LCS 286 is designed to (1) maintain a redundant system's state and control state transitions, (2) accept all the redundant related management commands, such as manual switchover, split and join, (3) start system initiated switchover, both graceful and ungraceful, and (4) control inter-CPU tasks, voting, heartbeat and protected data synchronization and protected data updating. This approach has several advantages, including (1) centralizing redundancy control in order to eliminate the possibility of inconsistent software states among different subsystems, and (2) isolating redundancy-specific software such that other modules can be redundancy-transparent.

Figure 5:
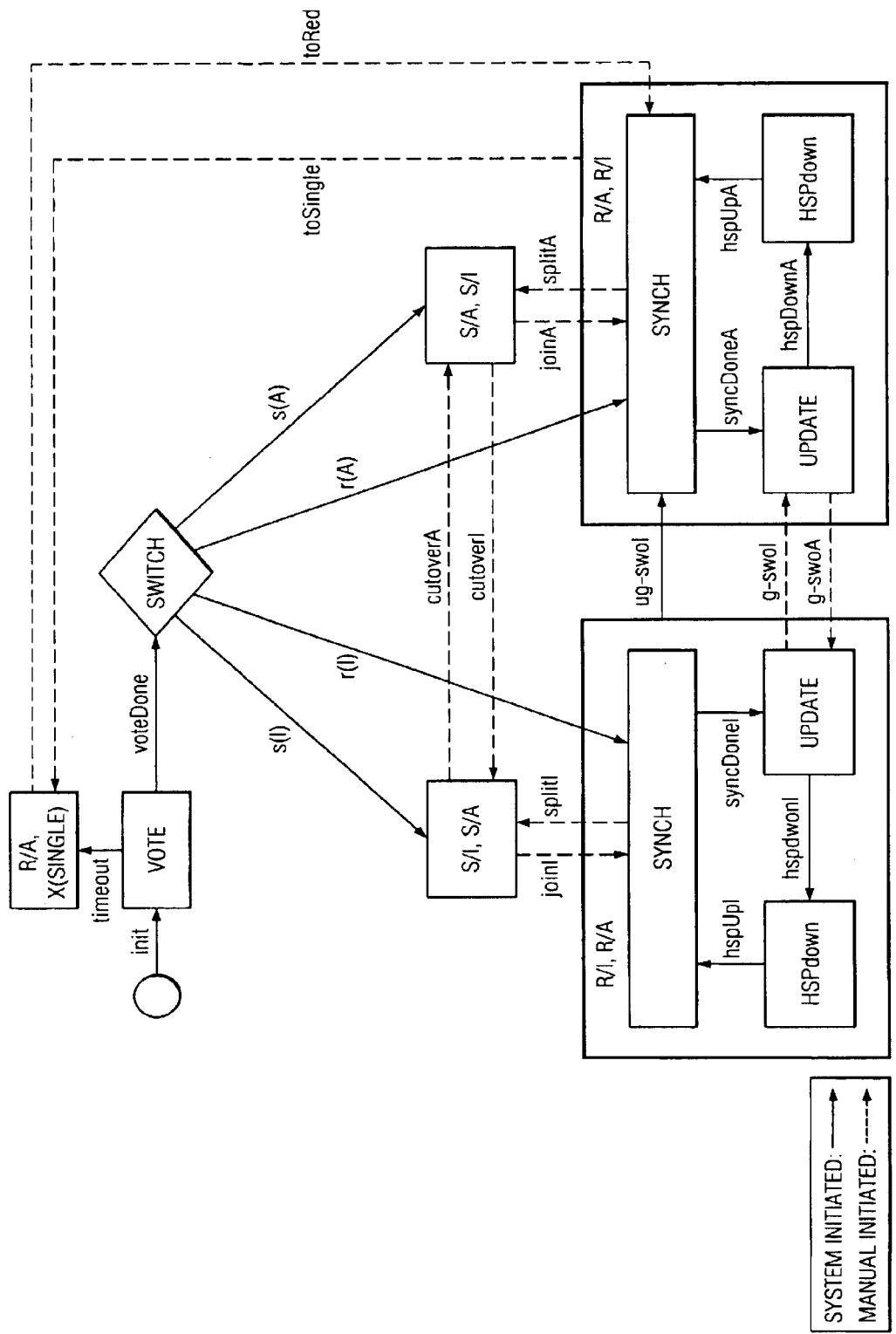
FIG. 5 is a state diagram showing the states of a logical call server.

FIG. 5 is a state diagram showing the states of LCS 286. Note that broken lines indicate manual initiated and solid lines indicate system initiated actions. LCS 286 starts the initiation by moving to a vote state. If no vote occurs, meaning that there is a catastrophic problem such as one of the systems being down, the state moves to R/A, X, meaning a single side is up. If a vote is performed, the state moves to a switch state, and the system will move either to system active s(A) or system inactive s(I). If the system is active LCS 286 moves to S/A, as indicated in state S/A, S/I. A cutbover of the inactive (cutover I) causes the state to move to S/I, S/A (and back if cutover A occurs). If a join is performed, then LCS 286 moves to state synch in block R/A, R/I. State synch means that data will be sent to the other side.

From synch on the block R/A, R/I, LCS 286 can cause the system to move to single state R/A, X. The system may also move from synch to update upon synch A being done. Update is the normal state of the system, and updates are periodically being sent to the other side.

From update, the system may move to state HSP down if it is determined that the high speed pipe is down. From HSP down, the system may move back to synch if the high speed pipe comes back up.

The system may also move from update in block R/A, R/I to update in block R/I, R/A if there is a graceful switchover active (g-swoA). For example, there might be a graceful switchover to the other system for routine maintenance. The system may move back to the update in block R/I, R/A if there is a graceful switchover inactive (g-swoI).

From block R/I, R/A, there may be an ungraceful switchover (ug-swoI), which moves the system to the synch state in block R/A, R/I.

From switch state, LCS 286 may also move the system along s(I) to S/I in state S/I, S/A. When a join inactive (joinI) is performed, the system moves to ,synch in block R/I, R/A. The movements among states on block RI/, R/A are similar to those on the block R/A, R/I.

From synch in block R/I, R/A, if a split inactive (splitI) is performed the system moves to S/A in state S/I, S/A.

Heart beat 304 periodically monitors the other side's status and reports any status change to LCS. Heartbeat manager 304 is responsible for monitoring the status of the other node. It sends a message via HSP to exchange status between the two sides. Heartbeat manager 304 is designed to provide several functionalities. The heartbeat manager 304 on the inactive side sends a heartbeat request to the heartbeat manager 304 on the active side. The heartbeat manager 304 on the active side sends back a heartbeat reply to the heartbeat manager 304 on the inactive side. The heartbeat messages, both request and reply, contain health information. Heartbeat manager 304 will inform any health change of other side to LCS. LCS controls heartbeat manager 304 by sending start or stop message to HB manager. To ensure that a failure in the high speed pipe does not cause an unnecessary ungraceful switch-over, dual communication channels are used for heartbeat messages.

In one embodiment, two pipes are used for vote and heartbeat messaging: High Speed Pipe and Ethernet. Two pipes have several advantages, including: (1) eliminating single point of failure to increase system reliability, and (2) avoiding unnecessary ungraceful switchover when the HSP pipe fails.

SWOMgr 288 controls and coordinates system redundancy related activities, namely, graceful switchover (G-SWO), ungraceful switchover (UNG-SWO), Split, Join, and Cutover. Upon detection of a faulty condition in the active system, the present invention implements one of two types of switchovers, namely, graceful and ungraceful. A graceful switchover occurs when the contents of the DRAM in the backup system has the same contents as the DRAM in the active system, and the state of CPU 64 of the active system is also saved in the other redundant system. When the active system determines a fault condition in a graceful switchover, the system is briefly halted. During the halt all of the memory in the active system, including the memory contents of CP PII 24, are transferred to the inactive system over HSP 26. This allows switchover from the active to the inactive system within one or two instructions. All calls are maintained in a graceful switchover, even those that are in transition.

An ungraceful switchover occurs when a more catastrophic event occurs, such as when CP PII 24 dies completely. This requires the active system to switchover to the inactive system by copying only a section of DRAM 60 over to the other system. Calls that are in progress are maintained, but calls that are in transition are lost.

LCS 286 is master of SWO manager 288. When LCS 286 decides that a switchover should occur, a message is sent to SWO manager 288 requesting that a switchover be effectuated. The switchover manager 288 on each side communicates information regarding the switchover to the other switchover manager 288 to coordinate the switchover, bringing down one side and bringing up the other side. SWOMgr 288 implements low level functions for redundancy related operations, e.g., save and restore registers, stop and copy during, a graceful switchover. Because the system has both graceful switchover and ungraceful switchover capability, Stop and Copy with PData Replication copies the memory region of main OS from the active side to the inactive side at G-SWO time and has PData replicated all the time so that it is ready for an UNG-SWO anytime.

PDataMgr 292 is responsible for mirroring protected data from the active side to the inactive side. PDataMgr 292 makes sure that information is sent over the high-speed pipe for replication on the other side.

Disk redundancy 290 ensures that important files are replicated on two disks. Disk redundancy 290 is turned on by syncing the two disks. It is turned off by stopping the mirroring mechanism. LCS 286 is responsible for sending messages to disk redundancy 290 to turn on/off. LCS uses disk redundancy 290 when it wants it to sync, stop sync, or stop updating. The primary interface to disk redundancy 290 is through the I/O system. Normal reads and writes are intercepted on their way down below the I/O system. Disk redundancy is transparent to the user application.

During disk synchronization all updates (writes and iocti calls that modify the disk) on the protected and unprotected partitions will be mirrored to the slave CP when the system is in redundant mode.

Figure 7:
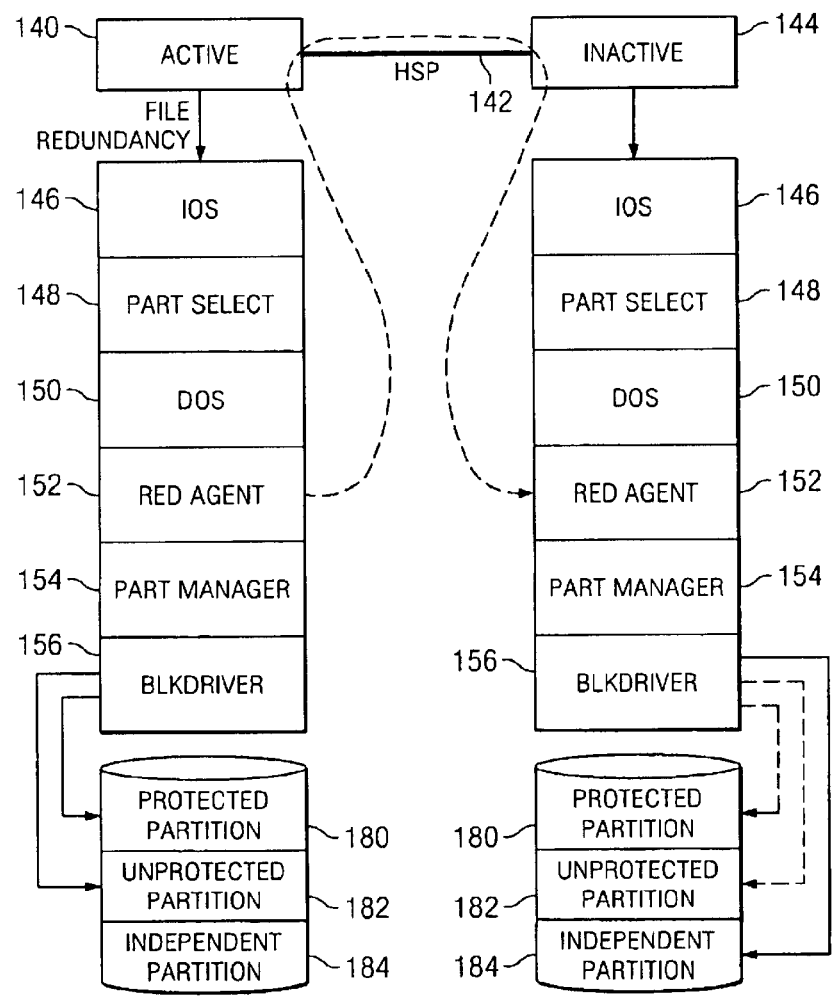
FIG. 7 illustrates disk redundancy.

Redundancy state is stored in LCS 286, and can be read by disk redundancy 290. With the state known, it can decide whether or not to propagate all update I/O across the high-speed pipe. FIG. 7 illustrates disk redundancy. From active node 140, when an application does an update I/O, the request is sent down through the layers (i.e., IOS 146, Part. Select. 148, DOS 150) until it reaches the redundancy agent 152. Redundancy agent 152 sends the request down to the block device driver 156 as normal, but also sends a command to the high-speed pipe (shown in broken line) to instruct inactive node 144 to do the update I/O as well. When inactive node 144 receives the command, it writes it to the redundant partitions. Inactive node 144 has its own I/O as well. Certain applications run on the inactive node and do all I/O to the independent partition. Partition manager 154 is the layer that routes incoming I/O to the appropriate physical partition (e.g., Protected Partition 180, Unprotected Partition 182, or Independent Partition 184).

In split mode, the system behaves a little differently. In this scenario, there are two active nodes, each totally independent. When the nodes are in split mode, they both only use their individual protected and unprotected partitions. The independent partition is not used. The redundancy agent does not propagate update I/O because the system is in split mode.

A multiple partitioning scheme is implemented that provides three separate partitions on the same hard disk. It can set up the disk into standard MS-DOS format partitions. In the CPP model, three partitions are setup according to the following table:

| Side | Partition requested | Partition used |
| --- | --- | --- |
| Master | /p | /C |
| Master | /u | /D |
| Slave | /p | /C |
| Slave | /u | /E |

The partitioning scheme also allows an application to retrieve the partition information from the disk. This includes the number of partitions, the sizes of each, where they begin/end, and the type of file system located on each. The users of disk redundancy only include other software modules.

Initialization of disk redundancy 290 is typically performed before disk I/O is needed, and initialized after communication manager 302 because it is dependent on the high speed pipe. In one embodiment, it is initialized before the communication manager is initialized—it will lie dormant until a disk sync message is received.

The disk redundancy system consistent with the principles of the present invention has several advantages, including: providing high data availability with low performance overhead, keeping the cost low by providing a design that does not depend on customized hardware, and minimizing modifications to the existing software by providing application-transparent disk redundancy software.

In one embodiment, disk redundancy is built on an IDE controller which comes with the CP card. As a result, no additional cost is required and no change is necessary to the existing hardware.

Data mirroring between the two disks is achieved via messaging over a high speed pipe. This same high speed pipe is used for protected memory mirroring, heartbeat, and switchover. There are several advantages of this approach, including: (1) two CPU nodes can be physically located at much farther distances, and (2) combined with the loosely-coupled CPU redundancy strategy, the redundant system will become a message-based system, which is advantageous for moving toward distributed computing.

In one embodiment, disk redundancy software is built on top of the disk device driver and under the DOS file system. This approach provides simplicity. The software is self-contained, independent of the file system, and there is no need to manage file system states during switchover, split and join operations.

Disk redundancy software in each side of the redundant system reports faults to the fault handling module of its own side. The disk redundancy software itself does not exchange fault information between the two sides. One advantage of this approach is that general fault handling mechanism should be the same for both simplex and duplex systems, and allow the logical call server to handle redundancy specific decisions. This also has the advantage that the logical call server module is the only module that has the information of both sides.

To effectively handle the differences in traffic requirements between disk redundancy, stop and copy, and the heartbeat/checkpointing facilities, in one embodiment three separate channels are implemented across the high speed pipe.

IP management 300 is responsible for managing the IP address for the call server. The main purpose of having an IP network in the switch is to provide a connection to an external management system such as craft access or other external applications. The IP management module 300 has several features. IP management 300 provides a virtual IP interface. IP management 300 manages IP addresses so that the call processor system can be addressed using a single IP address, even though each redundant side has its own IP address. IP management 300 in each side communicate information regarding IP addresses so an external entity, such as a craft access, can use a single IP address, and IP management ensures that the information is appropriately routed to the side that is active at the time.

To facilitate communication with external systems running on a LAN, the present invention is equipped with two Ethernet ports, which are connected to the LAN. Thus, certain IP management functionalities are provided. Since both nodes are running, two IP addresses allow external systems to talk to both nodes even though the system is addressed using a single IP address. An IP address is not assigned to a physical node (node 0 or node 1). External devices communicate with the call processor using a single IP address. The internal IP address for addressing a node is determined by whether a node is active or inactive. Active-IP-address is used by the active side and the inactive-IP-address is used by inactive side. This approach enables external systems to maintain connection to the active node during a switchover.

Gratuitous address resolution protocol (ARP) handles run-time IP address change. When a host's IP address is changed, it broadcasts its IP address and its MAC address to the network. Other nodes on the network can continue to communicate with the host. In the present invention, gratuitous ARP is used during a graceful switchover. Graceful switchover copies the entire memory image from the old active side to the new active side. As a result, the new active side gets the active-IP-address but it still has the existing MAC address. To inform this change the new active side sends a gratuitous ARP as one of its post-switchover actions. The gratuitous approach is useful in a multi-node architecture. During the post-switchover, the new inactive side sets its IP address to the inactive P-address by calling a function, such as VxWork's if AddrSet( ), which does gratuitous ARP.

The new active side goes through a warm restart to set its IP address to active-IP-address. DRAM 60 is divided into three areas: protected, unprotected, and persistent. In conventional systems, a restart erases the contents of DRAM 60. In the system shown in FIG. 3, however, part of DRAM is preserved upon restart. This allows a warm restart of the system. During normal operation, when a transaction occurs that changes DRAM 60, the same data is also transmitted over PCI bus 0, S. bridge 88, PCI bus 1 104, and over HSP GNIC 116 to the corresponding DRAM in the other redundant system.

Figure 8:
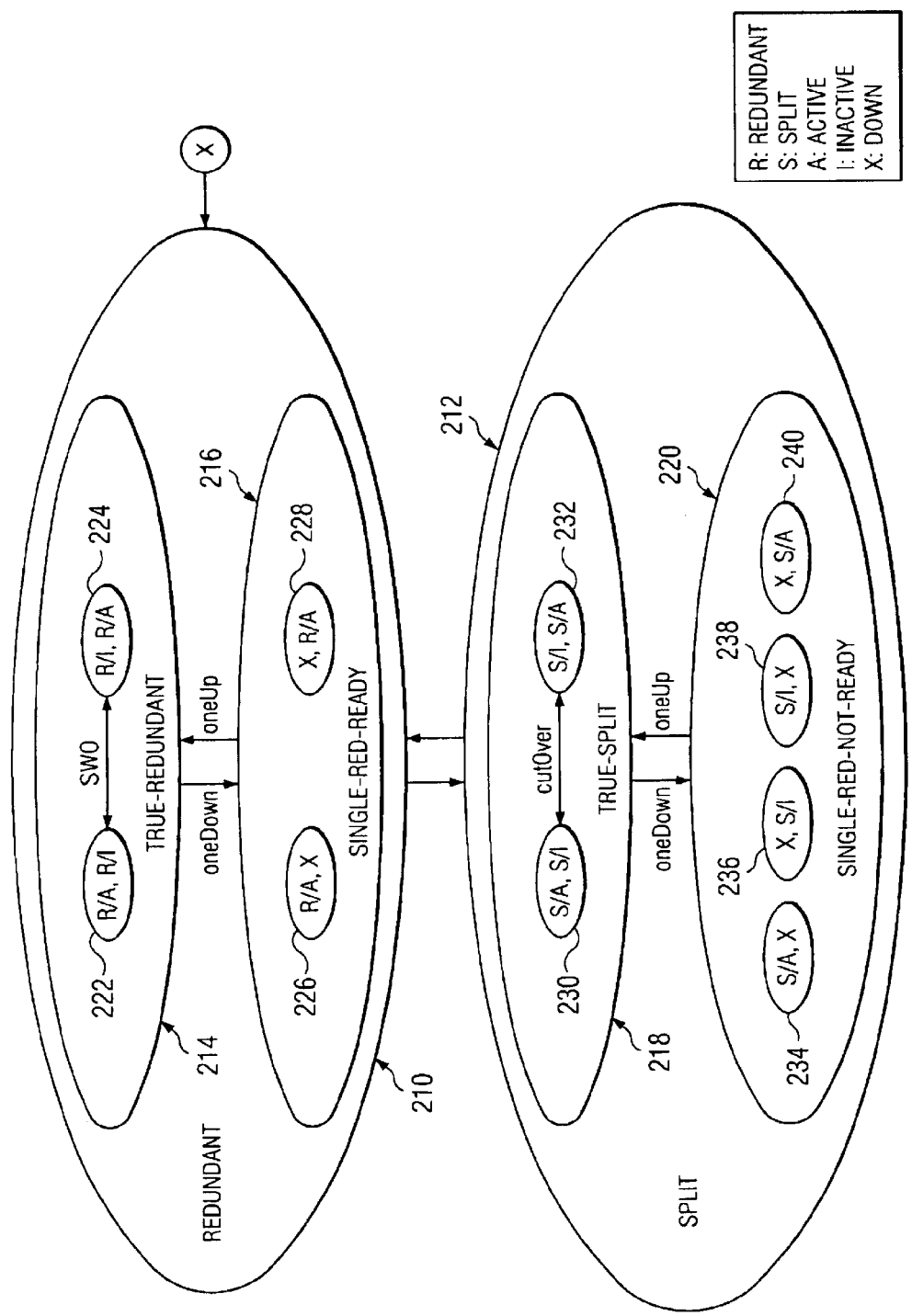
FIG. 8 is a state diagram illustrating the redundancy states of a call processor.

FIG. 8 is a state diagram illustrating the redundancy states that call processor systems consistent with the invention go through. In a redundant state 210, there are two states, true redundant 214 and single redundant ready 216. The call processor system moves between true redundant 214 and single redundant ready 216 when one side is taken down or brought up.

In true redundant state 214, switchover causes a state change between redundant/active and redundant/inactive (R/A, R/I) 222 on one side and, correspondingly, redundant/inactive, redundant/active (R/I, R/A) 224 on the other side. Thus, when one side is in R/A, the other side is in R/I, and vice versa. In single redundant ready state 216, the sides are in R/A, down 226 or down, R/A 228.

Split mode is used when it is desirable to break redundancy in a controlled way. Split is used when one side needs to be brought down, such as for maintenance. In split state 212, the call processor system moves between true split 218 and single redundant not ready 220 when one side is taken down or brought up. In true split state, cut over causes one side to move between split/active and split/inactive (S/A, S/I) 230 and the other side to move, correspondingly, between split/inactive and split/active (S/I, S/A) 232.

In single redundant not ready state 220, the call processor system exhibits S/A, down 234, down, S/I 236, S/I, down 238, and down, S/A 240.

Figure 9:
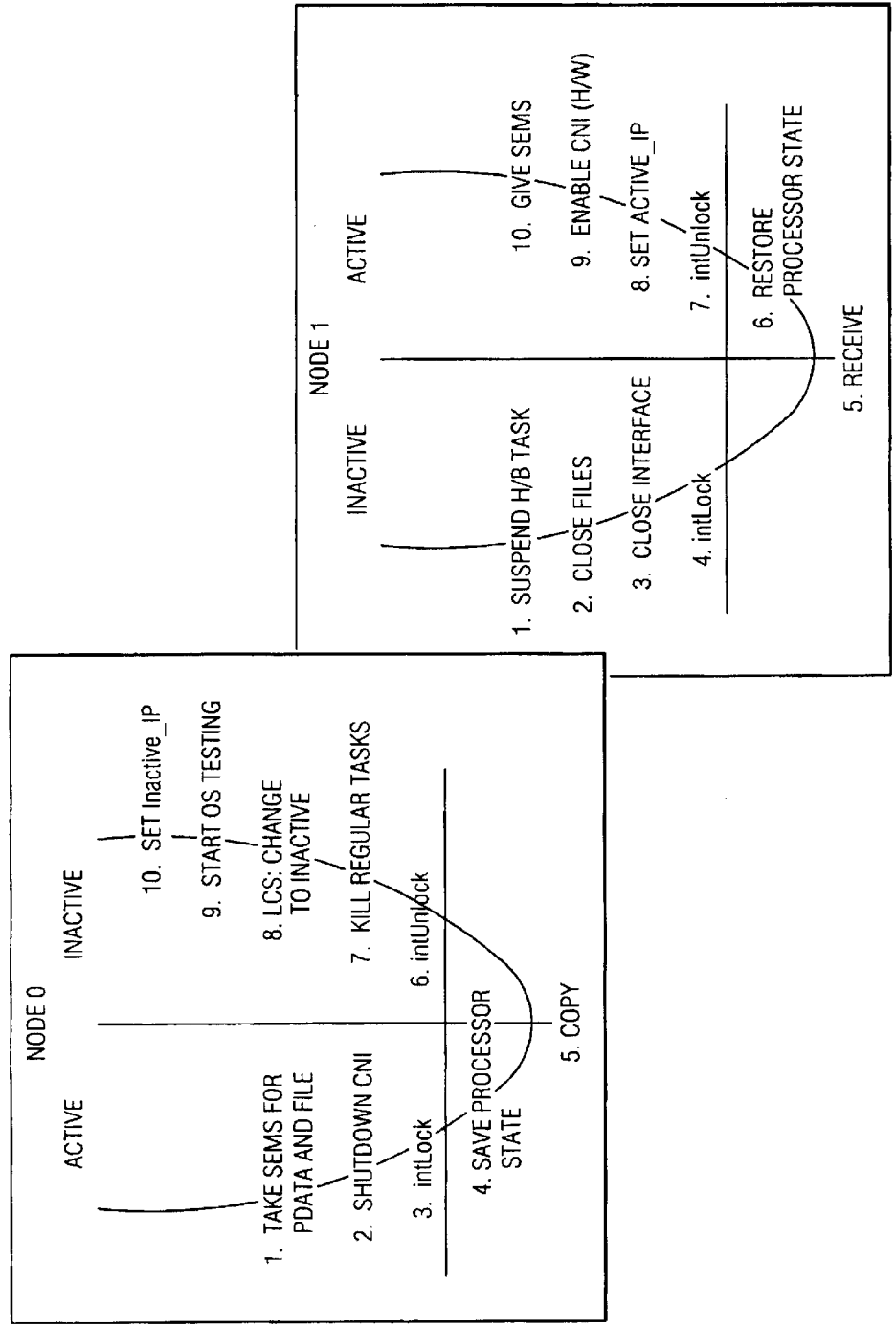
FIG. 9 shows the states that two nodes move through when going from active to inactive or inactive to active.

FIG. 9 shows the states two nodes move through when going from active to inactive or from inactive to active. The states represent the states that are moved through when LCS 286 requires a switchover using a graceful switchover for minimum impact. When node 0 goes from active to inactive, and node 1 goes from inactive to active, node 0 moves through steps 1–5 in the left block of the figure, and node 1 moves through steps 5–10 of the right block.

Node 0: (1) take semaphores for Pdata & file, (2) shutdown CNI, (3) intLock, (4) save processor state, and (5) copy. Node 1 then (5) receives, (6) restore processor state, (7) int Unlock, (8) set Active_IP, (9) enable CNI (H/W), and (10) give semaphores. Thus, node 1 has basically reversed back out of the states node 0 went through.

Node 1: (1) suspend H/B task, (2) close files, (3) close interface, (4) intLock, (5) copy, (6) intUnlock, (7) kill reg tasks, (8) LCS: change to inactive, (9) start OS testing, and (10) set Inactive_IP.

For node 0, step 1 involves taking a semaphore for Pdata and file access, so they are locked. This prevents the other tasks other than LCS 286 from performing these functions until the semaphore is released. Step 2 involves shutting down the core to network interface, shutting down the interfaces into the TDM network. In step 3 the interrupts are locked, effectively stopping the OS from running. In this state, below the horizontal line in the left block of the figure, the OS is disabled. The high speed pipe, though, is able to transfer the necessary data to the other node without assistance from the OS. In step 4, the context of the processor is saved. The processor in node 0 has an instruction that saves all registers, stacks and other processor memory content to a particular memory area. The high speed pipe then transfers this data in step 5.

Continuing with the step 6 in the right block, node 1 restores the processor state, unlocks interrupt, sets IP active, enables CNI, and gives the semaphores. Giving semaphores allows the other tasks in node 1 to begin operating. Thus, node 1 has become active in the identical state that node 0 was in when node 0 went inactive.

For node 0, in step 6, the interrupts are unlocked, the regular tasks are killed in step 7, LCS is changed to inactive, OS testing is started, and the IP is set to inactive.

For node 1, going into the active from inactive, step 1 requires suspending heartbeat task in step 1, files are closed in step 2, the interface is closed in step 3, interrupts are locked in step 4, and then the processor is copied.

What is claimed is:

1. A system for implementing a high-availability architecture comprising:

a first compact Peripheral Component Interconnect shelf;

a second compact Peripheral Component Interconnect shelf; and a network;

wherein the first and second compact peripheral component interconnect shelf are redundant systems;

wherein the first compact peripheral component interconnect shelf comprises a first system utility card connected to a first compact core to network interface connected to a first compute platform connected to a first high speed pipe interface;

wherein the second compact peripheral component interconnect shelf comprises a second system utility card connected to a second compact core to network interface connected to a second compute platform connected to a second high speed pipe interface;

wherein the first and second compact peripheral component interconnect shelfare connected via Ethernet;

wherein the first and second compact core to network interface is connected to the network.

2. The system according to claim 1, wherein the first compute platform comprises:

a central processing unit;

a L2 cache; and a dynamic random access memory.

3. A system for implementing a high-availability architecture comprising:

a first compact Peripheral Component Interconnect shelf;

a second compact Peripheral Component Interconnect shelf; and a network;

wherein the first and second compact peripheral component interconnect shelf are redundant systems;

wherein the network comprises a three-port extender, XNET, XPEC, and a line card.

4. A method for a graceful switchover in a system for implementing a high-availability architecture comprising a first computer system and a second computer system wherein the first and second computer systems are redundant systems, the method comprising:

taking a semaphore for Pdata and file access for the first computer system;

shutting down a core to network interface of the first computer system and shutting down interfaces to a network;

locking interrupts of the first computer system and stopping an operating system from running;

saving state information of a processor of the first computer system;

suspending a heartbeat task in the second computer system;

closing files in the second computer system;

closing an interface in the second computer system;

locking interrupts in the second computer system;

transferring state information of the processor via a high speed pipe to the second computer system;

restoring a processor of the second computer system to the state of the first computer system using the state information;

unlocking interrupts of the second computer system;

setting IP active of the second computer system;

enabling a core to network interface of the second computer system;

giving a semaphore for the second computer system; and unlocking interrupts of the first computer system, killing regular tasks of the first computer system, changing a logical call server state to inactive, testing the operating system of the first computer system, and setting IP to inactive.

5. A software module structure for implementing redundancy control in a system for implementing a high-availability architecture comprising a first computer system and a second computer system wherein the first and second computer systems are redundant systems, the software module structure comprising:

an applications layer;

an application adaptors layer;

an operating system extensions layer, comprising a logical call server module for managing the first computer system and the second computer system redundant state, controlling state transitions, coordinating redundancy-related operations, and controlling inter-CPU tasks, voting, heartbeat and protected data synchronization, and protected data updating, and a disk redundancy module;

a real-time operating system kernel layer;

a TCP/IP stack layer;

a lightweight protocol stack layer;

a hardware abstraction layer;

a board support package layer; and wherein the logical call server module comprises:

a vote state;

a redundant/active and down state which occurs from the vote state or from the redundant/active, redundant/inactive state;

a switch state which occurs from the vote state;

a split/inactive, split/active state which occurs from the switch state or from the split/active, split/inactive state or from the redundant/inactive, redundant/active synch state;

a split/active, split/inactive state which occurs from the switch state or from the split/inactive, split/active state or from the redundant/active, redundant/inactive synch state;

a redundant/inactive, redundant/active state comprising a redundant/inactive, redundant/active synch state, a redundant/inactive, redundant/active update state, and a redundant/inactive, redundant/active highspeed pipe down state;

a redundant/active, redundant/inactive state comprising a redundant/active, redundant/inactive synch state, a redundant/active, redundant/inactive update state, and a redundant/active, redundant/inactive highspeed pipe down state; wherein, the redundant/inactive, redundant/active synch state occurs from the switch state or from the split/inactive, split/active state or from the redundant/inactive, redundant/active high speed pipe down state;

the redundant/inactive, redundant/active update state occurs from the redundant/inactive, redundant/active synch state or from the redundant/active, redundant/inactive update state;

the redundant/inactive, redundant/active high speed pipe down state which occurs from the redundant/inactive, redundant/active synch update state;

the redundant/active, redundant/inactive synch state occurs from the switch state or from the split/active, split/inactive state or from the redundant/active, redundant/inactive high speed pipe down state or from the redundant/active, done state or from the redundant/inactive, redundant/active state;

the redundant/active, redundant/inactive update state occurs from the redundant/active, redundant/inactive synch state or from the redundant/inactive, redundant/active update state; and the redundant/active, redundant/inactive high speed pipe down state occurs from the redundant/active, redundant/inactive synch update state.

* * * * *